P. J. CLEEREMAN.
BEET HARVESTER.
APPLICATION FILED MAR. 15, 1919.

1,342,795.

Patented June 8, 1920.
4 SHEETS—SHEET 1.

WITNESS

INVENTOR
Peter J. Cleereman
BY
ATTORNEYS

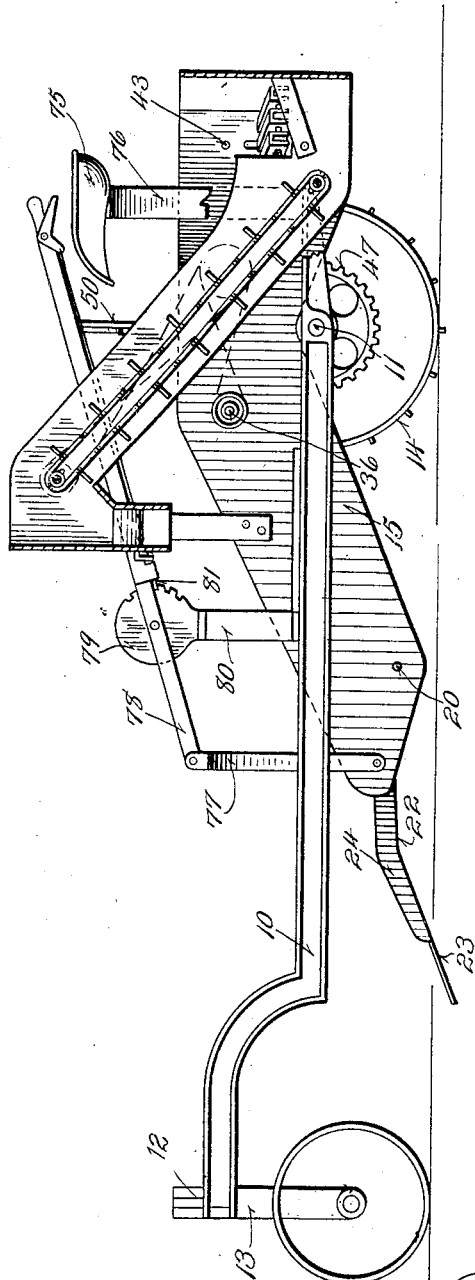

P. J. CLEEREMAN.
BEET HARVESTER.
APPLICATION FILED MAR. 15, 1919.
1,342,795.
Patented June 8, 1920.
4 SHEETS—SHEET 3.
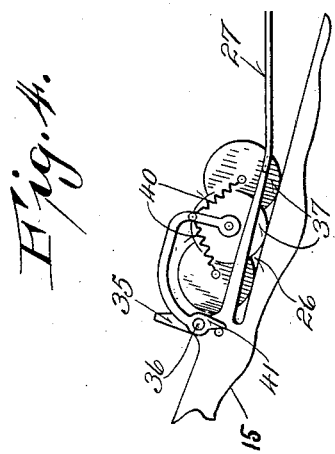
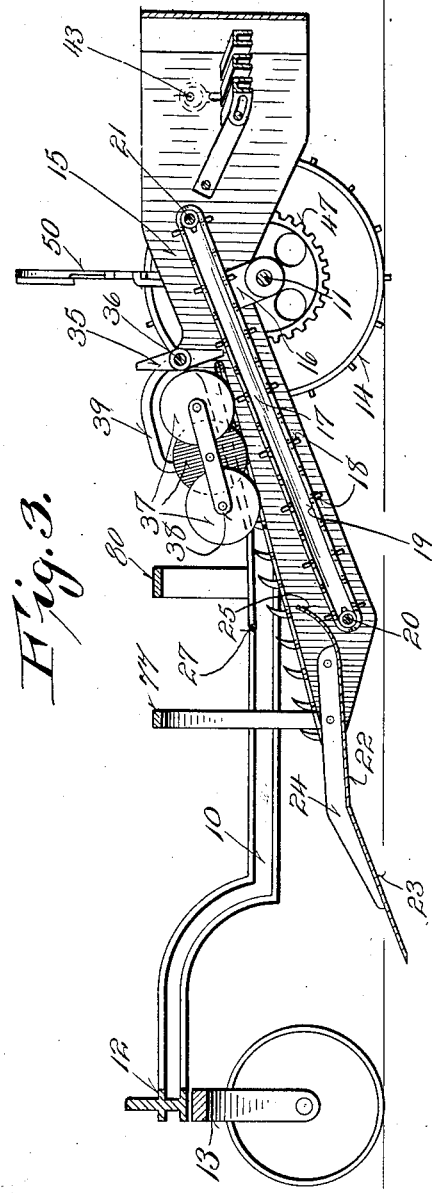
WITNESS
INVENTOR
ATTORNEYS

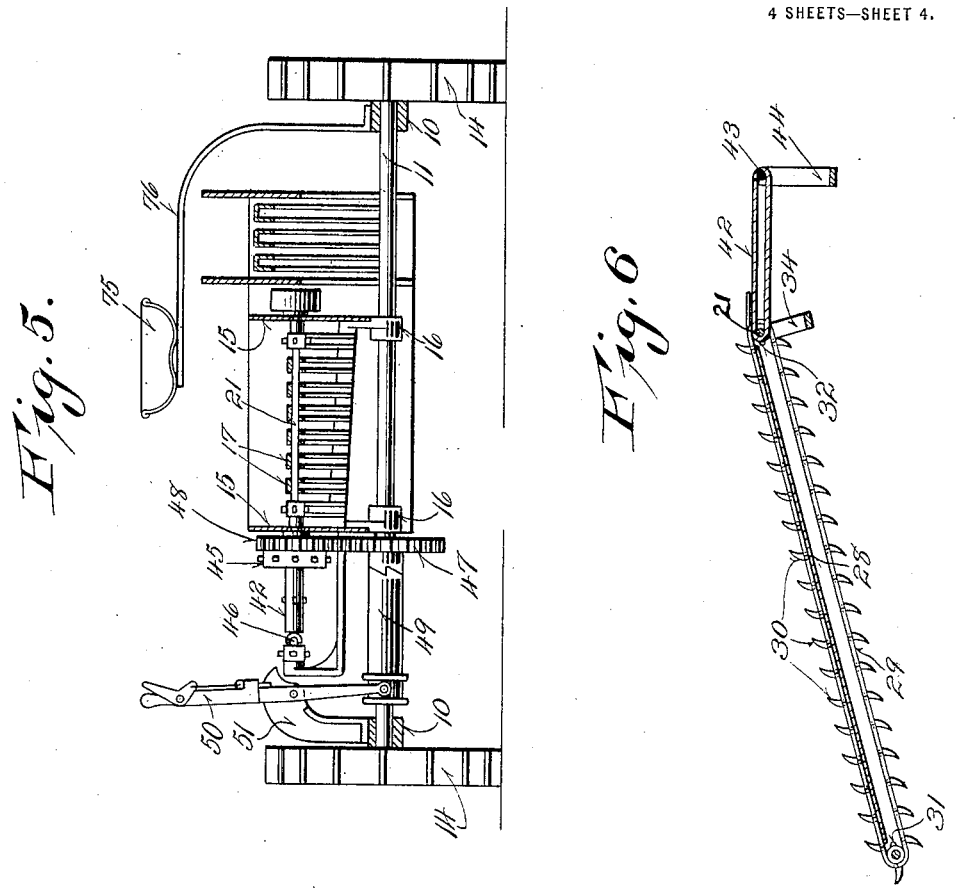

UNITED STATES PATENT OFFICE.

PETER J. CLEEREMAN, OF KENOSHA, WISCONSIN.

BEET-HARVESTER.

1,342,795.  Specification of Letters Patent.  Patented June 8, 1920.

Application filed March 15, 1919. Serial No. 282,936.

*To all whom it may concern:*

Be it known that I, PETER J. CLEEREMAN, a citizen of the United States, and resident of Kenosha, in the county of Kenosha and State of Wisconsin, have invented certain new and useful Improvements in Beet-Harvesters; and I do hereby declare that the following is a full, clear, and exact description thereof.

My invention relates to new and useful improvements in machines for harvesting beets or like crops and of that type provided with means for digging the beets or the like, and for cutting off the tops thereof.

It is in general the object of my invention to simplify and otherwise improve the structure and to increase the efficiency of machines of this character.

More particularly, it is the object of my invention to provide a mechanism for topping the beets or the like, which coöperates in a most compact and simple manner with the digging mechanism.

A detailed object in connection with the topping mechanism resides in the provision of an arrangement for shifting the top of the beets or the like into proper cutting position as the beets or the like move into the machine.

With the above and other objects and advantages in view, which will be apparent as the description proceeds, my invention resides in the novel features of construction, combination and arrangement of parts as hereinafter more particularly described and defined by the appended claims.

In the accompanying drawings:

Fig. 2 is a view of said machine partly in side elevation and partly in section on a plane indicated by the line 2—2 of Fig. 1.

Fig. 3 is a longitudinal sectional view through the machine on a plane indicated by the line 3—3 of Fig. 1.

Fig. 4 is a detail elevational view of the mechanism affording a contracted guide throat for the beet tops.

Fig. 5 is a transverse sectional view through the machine on the line 5—5 of Fig. 1.

Fig. 6 is a fragmentary sectional view showing the beet top conveying mechanism, the plane of this fragmentary view being indicated by the line 6—6 of Fig. 1.

Figure 1:
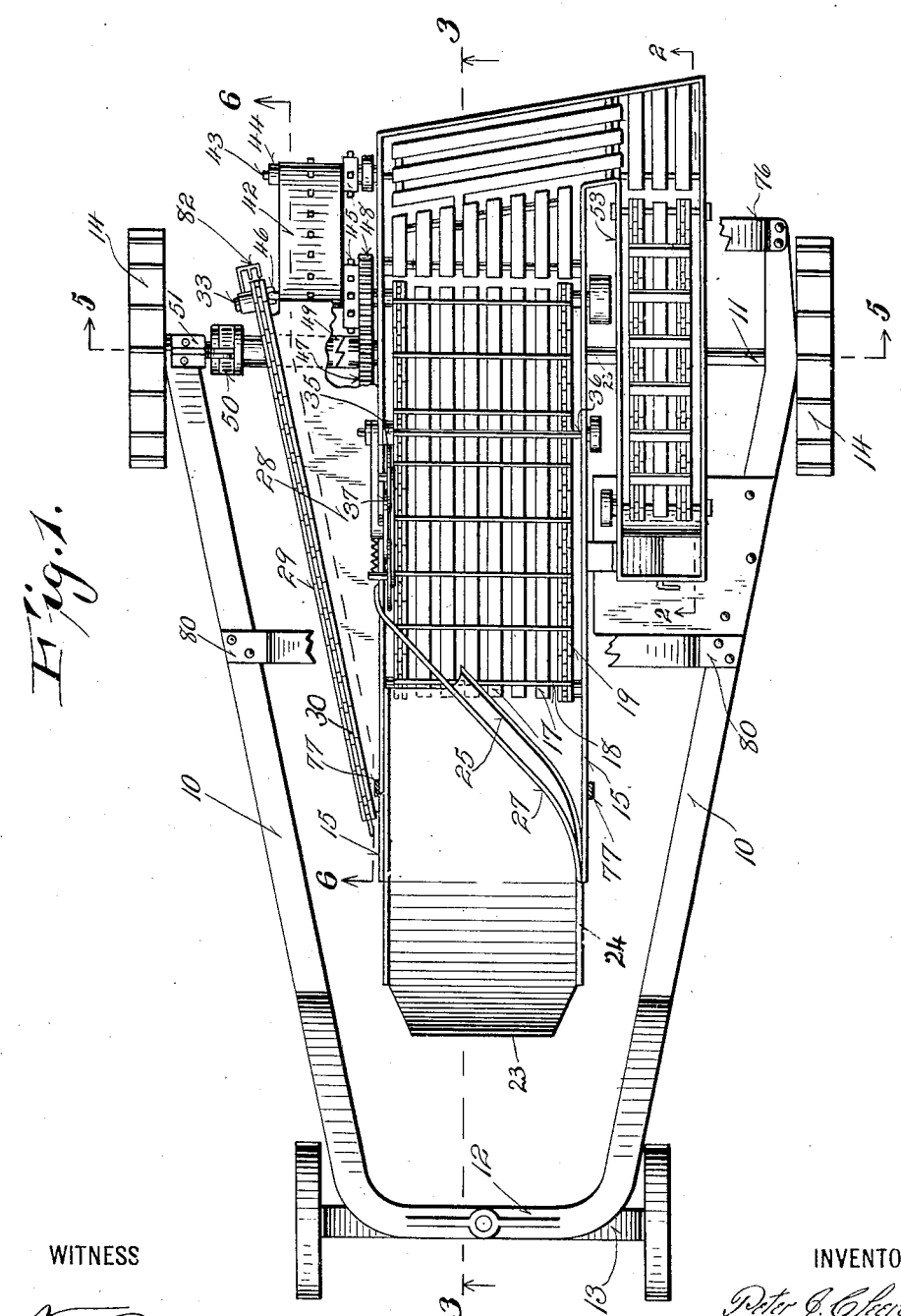
Figure 1 is a plan view of the beet harvesting machine embodying my invention.

Referring now more particularly to the accompanying drawings, the embodiment of my invention therein shown comprises a main frame formed of forwardly convergent side sills 10 having their rear end portions mounted on a drive axle 11, and connected at their forward end portions by a transverse sill 12 mounted on a pivoted draft truck 13, the forward end portions of the sills 10 being upwardly offset whereby their major portions are disposed at a desired low elevation. Ground wheels 14 are mounted on the ends of the drive axle 11 and preferably have the usual ratchet connection therewith whereby to afford a differential action in turning, no specific connection being however shown.

The digging, separating and topping mechanisms of the machine are also mounted on the drive axle 11. The elevating and separating mechanism includes side walls 15 having depending bearings 16 mounted on the drive axle, a series of slats 17 being disposed in longitudinal relation between the intermediate portions of the side walls to form an openwork bottom over which travel transverse, elevator plates 18 carried on endless chains 19 disposed adjacent the side walls 15 and trained about sprockets carried on forward and rear shafts 20 and 21 respectively. The forward end portions of the side walls carry a shovel plow which projects forwardly therefrom and which includes a substantially horizontal rear portion 22 and an inclined digging portion 23 adapted to project a desired distance beneath the surface of the ground to dig up the beets and the adjacent earth, the plow being provided with side wall portions 24 which afford its securement to the walls 15 and which are taperingly reduced in height toward the forward end of the plow. One rear corner portion of the plow plate is upwardly curved as at 25 to lie in a plane oblique to the axis of the machine and to thus turn the earth and beets toward one of the side walls 15. This side wall 15 is provided in its upper portion with a longitudinal slot 26, the forward portion of the wall being reduced in height whereby said slot is open at its forward portion, and said slot forms the constricted portion of a top guiding throat which is continued forwardly of the slot by a rod 27 joined with the upper portion of the wall 15 at the forward end of the slot and curved from said point of juncture to extend obliquely across the rear portion of the plow, the forward end of the guide rod 27 being curved to merge into the plane of the side 24 of the plow remote from the slotted wall 15. A table 28 extends from the slotted wall 15 in substantially the plane of its slot 26, said table being taperingly increased in width toward the rear end of the machine, and having disposed along its outer edge the upper stretch of an endless conveyer chain 29 which carries top engaging spurs 30 and which is trained about an idle sprocket 31 at its forward end and about a drive sprocket 32 at its rear end, said drive sprocket being carried on a stub shaft 33 journaled in a bearing bracket 34 carried by the wall 15.

Thus it is seen that as the machine progresses, the inclined forward portion of the plow will dig up the beets and adjacent earth, which upon reaching the substantially horizontal rear portion of the plow by the pressure of the earth and beets subsequently dug, will move from the tilted position imparted thereto by the inclined plow portion 23 and will then be engaged by the share portion 25 of the plow and turned toward the slotted wall 15, the guide rod 27 simultaneously engaging the tops of the beets and turning them to one side whereby they are guided into the restricted portion of the throat, that is into the slot 26, the spurs 30 of the conveyer chain 29 engaging the beet tops in this movement to insure their proper disposition in the slot, it being noted that the conveyer chain 29 is driven at the same rate of speed as the conveyer plates 18, thus as the beets progress rearwardly, they are shifted toward the slotted wall 15 to extend the entire tops of the beets through the slot whereby the tops may be positioned for accurately cutting them off at their junctures with the beet. This cutting action is effected by radial knife blades 35 carried on a shaft 36 extending between and journaled in the walls 15, said blades 35 being disposed at the inner face of the slotted wall 15 at the inner end of the slot thereof. To prevent the possibility of small beets passing through the guide throat, particularly at the wider portion thereof, a series of, in the present instance three, disks 37 are mounted on a bar 38 which is pivotally carried on an arm 39 pivoted in turn to the slotted wall 15, said disks being of equal diameter and adapted to move across the slot 26 and to yield upon passage of beet tops therethrough, thus forming a contractile inner throat portion, the disks being yieldably held with their axes in alinement parallel to the slot 26, by contractile springs 40 secured to the support arm 38 and to the end pivots of the disks, the arm being held from swinging movement to dispose the disks below the slot 26 by a stop 41 on the pivoted end portion of the arm.

To insure clearance of the cut beet tops from the machine, a conveyer belt 42 is trained about the projected end of the upper elevator shaft 21, which extends under the rear edge of the table 28, said belt 42 being also trained about and driven from a rear shaft 43 journaled in the adjacent wall 15 and in a bracket 44 extending therefrom, this belt being driven at a greater speed than the conveyer heretofore described by a sprocket connection 45 between the shafts 21 and 43, the outer end of the shaft 21 having a universal connection 46 with the stub shaft 33 which drives the beet top conveyer chain 29.

For driving the various conveyers described, a gear wheel 47 is loosely mounted on the drive axle 11 and this gear wheel meshes with a gear 48 on the conveyer shaft 21. A clutch sleeve 49 is splined on the drive axle 11 and is adapted to engage the hub of the loose gear wheel 47, movement of this sleeve to and from clutching position being controlled by a spanner lever 50 pivoted on a bracket 51 upstanding on the adjacent side sill 10 of the main frame.

The driver's seat 75 is carried on a bracket 76 extended upwardly from one of the side sills 10 of the main frame and then directed over the rear portion of the mechanism, and to provide an arrangement convenient of access from the driver's seat for adjusting the depth of the shovel plow in the ground, a bail 77 is pivoted to the forward end portion of the walls 15 and is connected with the forward end of a lever 78 which is pivoted on a segment plate 79 carried by arms 80 secured to and convergent upwardly and inwardly from the intermediate portions of the side sills 10 of the main frame, said lever extending rearwardly to a point adjacent the driver's seat 75 and carrying a pawl 81 coöperating with notches in the segment plate 79 to hold the plow in desired positions, it being obvious that the mechanism moves about the axle as an axis in this adjustment of the plow.

A simple and compact machine is thus provided which will efficiently dig beets or like crop, and cut off the tops of said beets or the like. Summarizing the operation of the machine, it will first be noted that the present embodiment of the invention is adapted particularly for harvesting that relatively small type of beets which are used in canning or for direct use as a food, in contradistinction to the larger sugar beets. The beets and the adjacent earth are dug up bodily by the shovel plow, and as this mass moves rearwardly on the plow by continuation of the digging action, the beets and their tops are tilted by the shaft portion 25 of the plow and by the guide rod 27 so that they move to the side of the machine adjacent the slot 26 which comprises the constricted rear end of a guide throat which has its wide portion extending obliquely of the machine. As the beets move to the rear end of the slot, with their tops simultaneously drawn through the slot to a maximum extent, said tops are cut off, the beets continuing their progress over the elevator slats 17, the major portion of the dirt carried into the machine with the beets being discharged through these slats. The tops are carried rearwardly of the machine and discharged, said tops being stripped from the spurs 30 of the conveyer chain 29 by a stripper fork 82 disposed at the rear end of the chain.

While I have shown and described a preferred embodiment of my invention, it will be appreciated that to adapt the machine for digging a larger type of beet, or for meeting other different operative conditions, that various changes and modifications of structure may be employed without departing in any manner from the spirit of my invention.

What is claimed is:

1. A beet harvester including a plow, a conveyer mechanism extending rearwardly from the plow, a rearwardly extending throat at one side of the conveyer mechanism, said throat being taperingly reduced toward its rear end, means for guiding beet-tops into said throat upon movement of beet and tops on the conveyer, and means for cutting beet tops at the rear end of the throat.

2. A beet harvester including a plow, a conveyer mechanism extending rearwardly from the plow, a rearwardly extending throat at one side of the conveyer mechanism, said throat being taperingly reduced toward its rear end, means for guiding beet tops into said throat upon movement of beet and tops on the conveyer, means engageable with the beet tops for shifting them transversely in the throat during movement of beet tops and beets on the conveyer, and means for cutting beet tops at the rear end of the throat.

3. A beet harvester including a plow, a conveyer mechanism extending rearwardly from the plow, a rearwardly extending throat at one side of the conveyer mechanism, said throat being taperingly reduced toward its rear end, means for guiding beet tops into said throat upon movement of beets and tops on the conveyer, a toothed beet top engaging conveyer chain at one side of the conveyer mechanism and divergent with respect thereto rearwardly of the harvester, and means for cutting beet tops at the rear end of the throat.

4. A beet harvester including a plow, a conveyer mechanism extending rearwardly from the plow, a rearwardly extending throat at one side of the conveyer mechanism, said throat being taperingly reduced toward its rear end, a rod connected with the forward end of the upper portion of the throat and extended obliquely over the conveyer mechanism for guiding beet tops to the throat, and means for cutting beets at the rear end of the throat.

5. A beet harvester including a plow plate having a forward digging portion and having a rear corner portion extended upwardly to direct beets and earth to one side of the machine, a conveyer extending rearwardly from the plow plate, a throat extending along one side of the conveyer and adapted to receive beet tops, and means at the rear end of the throat for cutting said beet tops.

6. A beet harvester including a plow, a conveyer mechanism extending rearwardly from the plow, a rearwardly extending throat at one side of the conveyer mechanism, said throat being taperingly reduced toward its rear end, means for guiding beet tops into said throat upon movement of beet and tops on conveyer, means for yieldably contracting the reduced portion of the throat, and means for cutting beet tops at the rear end portion of the throat.

7. A beet harvester including a plow, a conveyer mechanism extending rearwardly from the plow, a rearwardly extending throat at one side of the conveyer mechanism, said throat being taperingly reduced toward its rear end, means for guiding beet tops into said throat upon movement of beet and tops on the conveyer, a series of rotatable members disposed along said reduced portion of the throat and yieldably urged to contract said rear portion of the throat, and means for cutting beet tops at the rear end portion of the throat.

In testimony that I claim the foregoing I have hereunto set my hand at Kenosha, in the county of Kenosha and State of Wisconsin.

PETER J. CLEEREMAN.